WILLIAM F. COLLIER.
Improvement in Wheels for Animal Traps.
No. 115,933. Patented June 13, 1871.
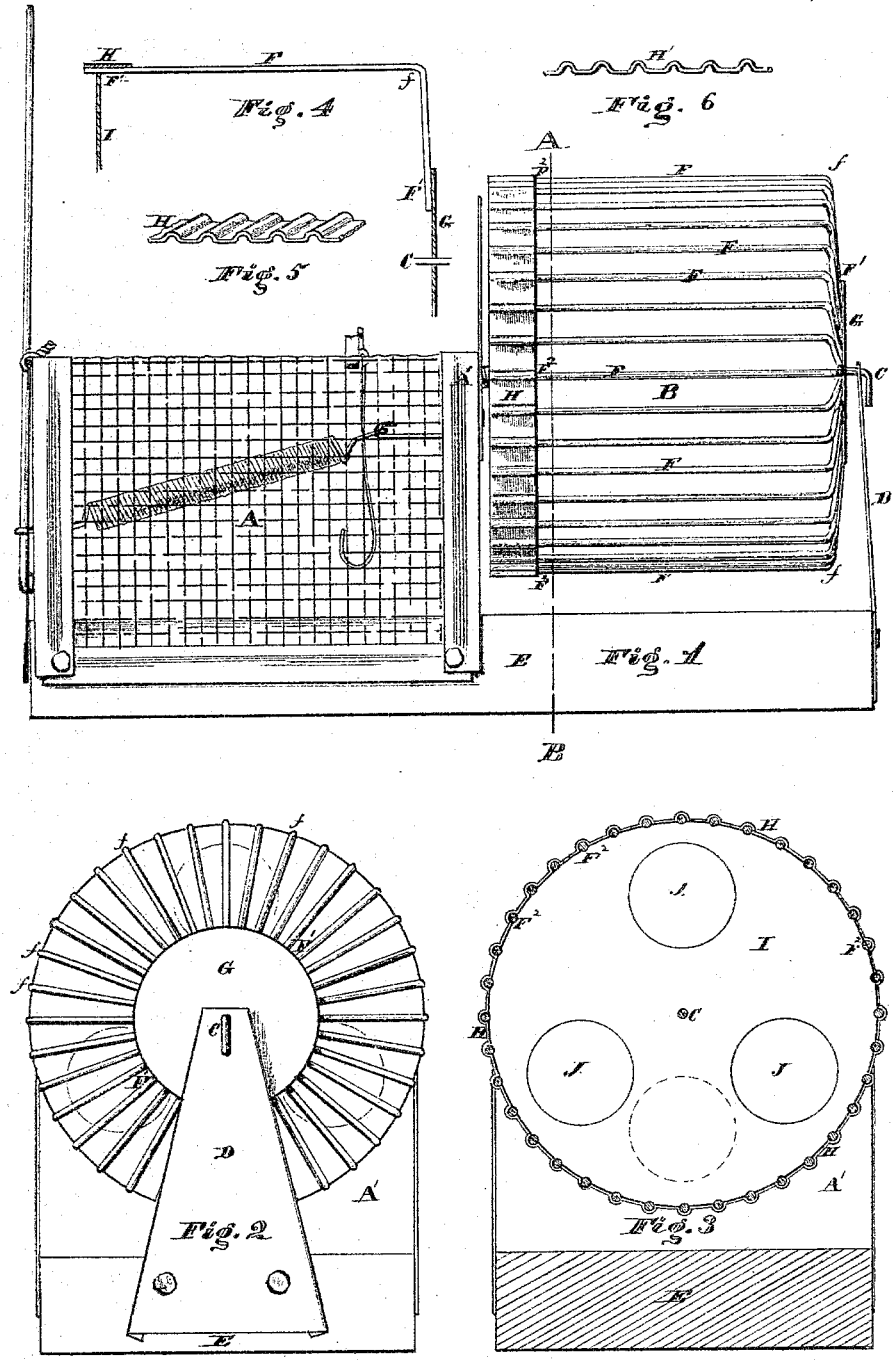

115,933

UNITED STATES PATENT OFFICE.

WILLIAM F. COLLIER, OF WORCESTER, MASSACHUSETTS.

IMPROVEMENT IN WHEELS FOR ANIMAL-TRAPS.

Specification forming part of Letters Patent No. 115,933, dated June 13, 1871.

*To all whom it may concern:*

Be it known that I, WILLIAM F. COLLIER, of the city and county of Worcester and State of Massachusetts, have invented certain new and useful Improvements in Wheels for Animal-Traps; and I do hereby declare the following to be a full, clear, and exact description of the same, reference being had to the accompanying drawing which forms a part of this specification, in which—

Figure 1 represents a side view of a trap provided with my improved wheel. Fig. 2 represents an end view of the same. Fig. 3 represents a transverse section of the same at line A B, Fig. 1. Fig. 4 represents a view of one of the wheel-wires, showing their form and the manner of attaching them to the other parts of the wheel. Fig. 5 represents a portion of the corrugated band for holding the ends of the wires, and Fig. 6 represents the corrugated band when made in a somewhat different form.

To enable those skilled in the art to which my invention belongs to make and use the same, I will proceed to describe it more in detail.

The nature of my invention consists, first, in a wheel for an animal-trap, constructed substantially as herein described, with tread-bars F, corrugated holding-band, and inner supporting-head, substantially as hereafter specified; second, in the combination with the tread-bars of a corrugated holding-band, as hereafter set forth; third, in an improved wheel for a toy animal-trap, the parts of which are constructed and combined together, as hereinafter described.

In the drawing, the parts marked A represent the body of the trap, which may, together with the baiting and springing devices, be constructed in any of the well-known forms. B indicates the wheel, which is supported and turns upon a horizontal pivot-wire, C, that extends from the end A' of the trap-body to a standard, D, projecting upward from the end of the bed-piece E, as shown. The wires of which the wheel B is composed are fastened at one end, $F^1$, to a small circular-plate or center disk, G, from which they extend radially to the periphery of the wheel, where they are turned inward at a right angle, as indicated at $f$, and carried across the wheel horizontally to form the parallel tread-bars F. The inner ends $F^2$ of the wires are secured to a corrugated band, H, said ends being retained in the proper relative positions by laying them into the corrugations or grooves of the band, where they are fastened, in this instance, by soldering into the inner end of the wheel a head or disk, I, of the proper size to fit the interior of the band H. The edge of the disk I, resting against the inner side of the wires, retains them in the grooves or corrugations of the band. Holes are formed at the centers of the disks G and I to receive the pivot-wire C. The disk I is also provided with openings J, through which the animal can pass from the body of the trap to the interior of the wheel. Instead of arranging the corrugated band H around the outside of the tread-bars F, the band may be arranged at the inside, and their ends $F^2$ be retained in the grooves or corrugations by bending the edge of the disk over them and securing it by soldering or otherwise. The band H may, when desired, be made of corrugated wire, as shown in Fig. 6; but I prefer to make it of corrugated sheet metal. The ends $F^1$ of the wheel-wires can be soldered to a central disk, C, as shown in the drawing; or they can be inserted into a hub suitably formed and bored for their reception; or, if preferred, the hub or center could be formed by collecting the ends of the wires in a mold and casting a metallic hub upon their ends; and again, instead of bending the wires at the periphery $f$, they can be formed in two pieces and joined at that point. I much prefer, however, the mode of construction shown in the drawing. If desired, the wires which form the end of the wheel can be curved or crossed instead of being directly radial, thereby making the end of the wheel more ornamental.

By making the wheel as herein described, with the outer end of open wire-work, a much better view can be obtained of the animal within the wheel, and when the wheel is in motion its lightness and openness, together with the scintillation and flashing of the light upon the bright radial wires, gives it a very graceful, brilliant, and pleasing appearance, while at the same time the animal is exhibited to a much better advantage than he can be within a wheel of the ordinary construction.

The construction of the wheel is simple and substantial, so that the wheels can be quickly and cheaply manufactured, and are not liable to become easily injured or broken, while, by the use of the corrugated band, a degree of uniformity and precision is obtained in laying the tread-wires which could not otherwise be obtained without considerable trouble and pains-taking.

Having described my improved wheel for animal-traps, what I claim therein as new and of my invention, and desire to secure by Letters Patent, is—

1. A wheel for animal-traps, constructed substantially as herein described, with tread-bars F, corrugated holding-band, and inner supporting-head, substantially as specified.

2. The combination, with the tread-bars F, of the corrugated holding-band H, substantially as and for the purposes set forth.

3. A wheel for an animal-trap, composed of a center disk, G, radial and horizontal wires F F¹ F², corrugated band H, and head-disk I, said parts being constructed and combined together substantially as shown and described.

WM. F. COLLIER.

Witnesses:
A. E. PEIRCE,
J. H. BIGELOW.